United States Patent
Miles et al.

(10) Patent No.: US 10,429,001 B2
(45) Date of Patent: Oct. 1, 2019

(54) STABLE MOBILE SCANNER

(71) Applicant: Altec Industries, Inc., Birmingham, AL (US)

(72) Inventors: Johnson X. Miles, Roanoke, VA (US); William Baldwin Dodge, IV, Roanoke, VA (US)

(73) Assignee: Altec Industries, Inc., Birmingham, AL (US)

( * ) Notice: Subject to any disclaimer, the term of this patent is extended or adjusted under 35 U.S.C. 154(b) by 183 days.

(21) Appl. No.: 15/243,274

(22) Filed: Aug. 22, 2016

(65) Prior Publication Data

US 2018/0052250 A1    Feb. 22, 2018

(51) Int. Cl.
| | |
|---|---|
| *F16M 13/02* | (2006.01) |
| *G01V 5/00* | (2006.01) |
| *F16M 11/04* | (2006.01) |
| *F16M 11/18* | (2006.01) |
| *F16M 11/20* | (2006.01) |
| *F16M 11/24* | (2006.01) |

(52) U.S. Cl.
CPC ........ *F16M 13/022* (2013.01); *F16M 11/046* (2013.01); *F16M 11/18* (2013.01); *F16M 11/2064* (2013.01); *F16M 11/2092* (2013.01); *F16M 11/24* (2013.01); *F16M 13/02* (2013.01); *G01V 5/0016* (2013.01)

(58) Field of Classification Search
None
See application file for complete search history.

(56) References Cited

U.S. PATENT DOCUMENTS

| | | | |
|---|---|---|---|
| 6,763,635 B1 * | 7/2004 | Lowman | B60P 1/5433 378/198 |
| 2011/0038453 A1 * | 2/2011 | Morton | G01V 5/0016 378/57 |
| 2012/0121072 A1 * | 5/2012 | Kotowski | G01N 23/04 378/198 |

* cited by examiner

*Primary Examiner* — Hoon K Song
(74) *Attorney, Agent, or Firm* — Erise IP, P.A.

(57) ABSTRACT

A mobile scanner includes a base, an articulating boom assembly, a scanning assembly, and a boom-power system. The articulating boom assembly includes a proximal vertical boom section pivotably secured to the base; a distal vertical boom section; and an intermediate horizontal boom section disposed between the proximal vertical boom section and the proximal vertical boom section. The articulating boom assembly forms a general inverted U-shape when in a deployed position, so as to present an opening therethrough for the passing of an object to be scanned. The scanning assembly is disposed at least in part on the distal vertical boom section for scanning the object in the opening. The boom-power system is configured to place the articulating boom assembly into the deployed position. The articulating boom assembly is configured to remain in the deployed position without the boom-power system keeping the articulating boom assembly in the deployed position.

20 Claims, 7 Drawing Sheets

STABLE MOBILE SCANNER

BACKGROUND

1. Field

Embodiments of the invention relate to mobile scanner and other scanning devices.

2. Related Art

The screening of trucks, containers, vans, and other vehicles as well as containers is performed at numerous locations. These locations can include docks, entry points, borders, airports, and other secure locations. Screening includes determining the interior contents of the vehicles and containers. This is sometimes known as cargo scanning or non-intrusive inspection. Determined interior contents may include explosives, weapons, nuclear materials, narcotics, and other contraband. The determined interior contents may also include people, currency, and undeclared cargo. Performing the scan is faster and more efficient than a manual inspection, allowing a higher percentage of objects to be inspected.

The screening is typically performed by an X-ray scanner at a screening location for a prolonged period of time. As such, the X-ray scanners of the prior art are required to run their main engine for a long period of time such that a hydraulic power system can keep an articulating boom aloft. Running the main engine for a long period of time wastes fuel and creates pollution, and may require continued adjustments to keep the articulating boom aligned.

SUMMARY

Embodiments of the invention solve the above-mentioned problems by providing a stable mobile scanner configured to keep an articulating boom aloft and in a deployed position without additional forces or energy being supplied. This allows the mobile scanner to be utilized in a low-power mode, such that only a scanning apparatus and other necessary systems are receiving power. This reduces fuel, pollution, noise, and other inefficiencies of mobile scanners.

A first embodiment of the invention is generally directed to a mobile scanner comprising a base, an articulating boom assembly, a scanning assembly, and a boom-power system. The articulating boom assembly includes a proximal vertical boom section pivotably secured to the base; a distal vertical boom section; and an intermediate horizontal boom section disposed between the proximal vertical boom section and the proximal vertical boom section. The proximal vertical boom section, the distal vertical boom section, and the intermediate horizontal boom section form a general inverted U-shape when in a deployed position, so as to present an opening therethrough for the passing of an object to be scanned. The scanning assembly is disposed at least in part on the distal vertical boom section for scanning the object in the opening. The boom-power system is configured to place the articulating boom assembly into the deployed position. The articulating boom assembly is configured to remain in the deployed position without the boom-power system keeping the articulating boom assembly in the deployed position.

A second embodiment of the invention is generally directed to an articulating boom assembly configured to be utilized with a mobile scanner. The articulating boom assembly comprises a boom turret; a proximal vertical boom section pivotably secured to the boom turret; a distal vertical boom section; and an intermediate horizontal boom section disposed between the proximal vertical boom section and the proximal vertical boom section. The proximal vertical boom section, the distal vertical boom section, and the intermediate horizontal boom section form a general inverted U-shape when in a deployed position, wherein the general inverted U-shape presents an opening therethrough. The articulating boom assembly is configured to remain in the deployed position absent a boom-power system.

A third embodiment of the invention is generally directed to a method of placing an articulating boom assembly of a mobile scanner into a deployed position, the method comprising the following steps: elongating a boom raise actuator disposed between a boom turret and a proximal vertical boom section; ceasing to elongate the boom raise actuator upon a base edge of the proximal vertical boom section contacting a boom rest of the boom turret such that the proximal vertical boom section is disposed vertically upward; shortening a horizontal deploy actuator disposed between the proximal vertical boom section and an intermediate horizontal boom section; ceasing to shorten the horizontal deploy actuator upon an actuator side of the intermediate horizontal boom section resting on a top edge of the proximal vertical boom section such that the intermediate horizontal boom section is disposed horizontally; elongating a vertical deploy actuator disposed between the intermediate horizontal boom section and a distal vertical boom section; and ceasing to elongate the vertical deploy actuator upon a protrusion of the distal vertical boom section resting on an interior edge of the intermediate horizontal boom section such that the distal vertical boom section is disposed vertically downward.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

Figure 1:
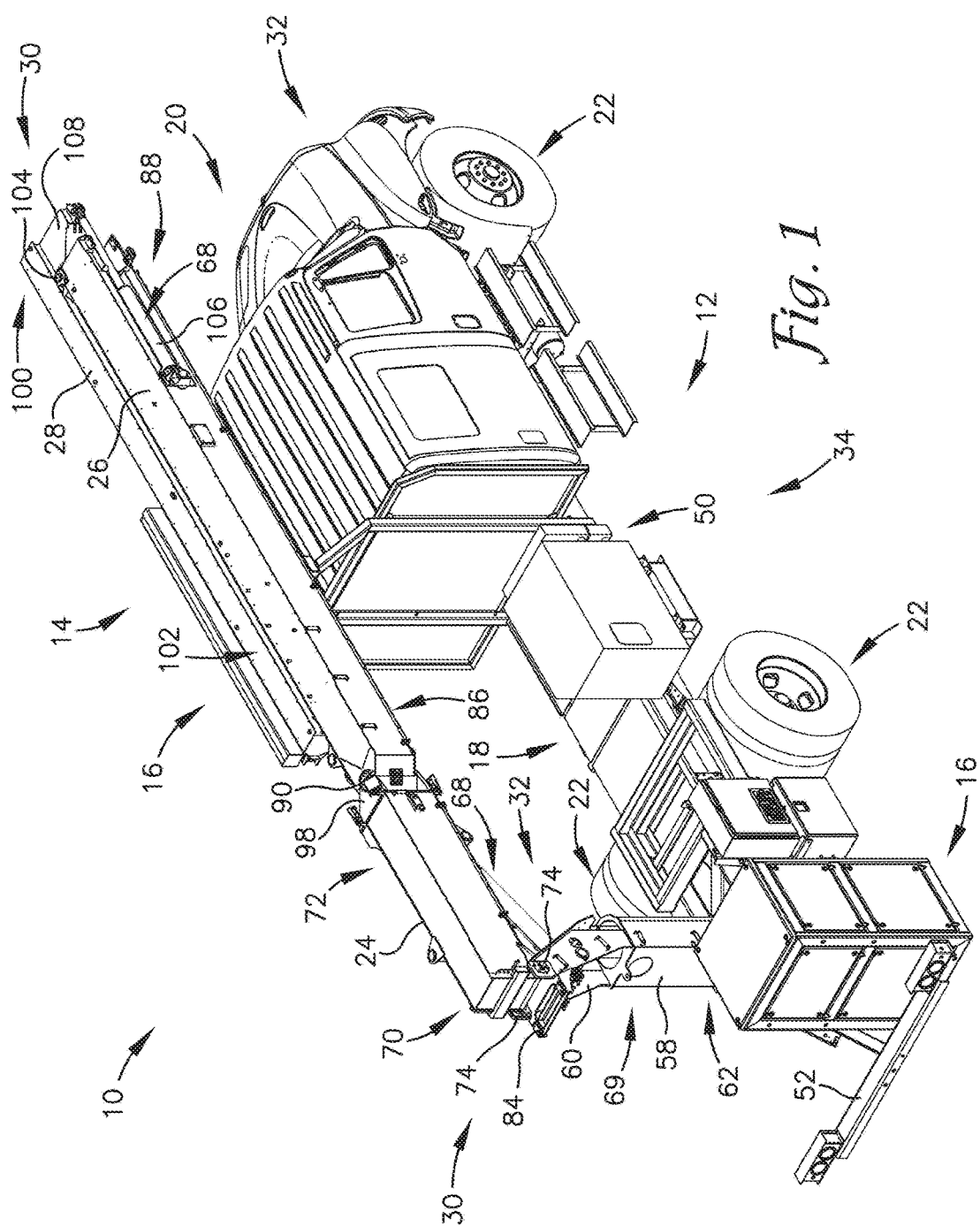
FIG. 1 is a perspective view of a first embodiment of the mobile scanner, illustrated in a traveling position.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etceteras described in one embodiment may also be included in other embodiments, but is not necessarily included. Thus, the invention can include a variety of combinations and/or integrations of the embodiments described herein.

Turning now to the drawings, an exemplary mobile scanner 10 with a base 12, an articulating boom assembly 14, and a scanning assembly 16. The base 12 includes a chassis 18, a cabin 20, and a plurality of wheels 22 is illustrated in FIG. 1. The chassis 18 supports the articulating boom assembly 14 as well as the other components. The cabin 20 is configured to support the operator therein during mobile operations, static operations, or both. The articulating boom assembly 14 is configured to pivot relative to the chassis 18. The articulating boom assembly 14 may include a proximal vertical boom section 24, an intermediate horizontal boom section 26, and a distal vertical boom section 28.

Figure 2:
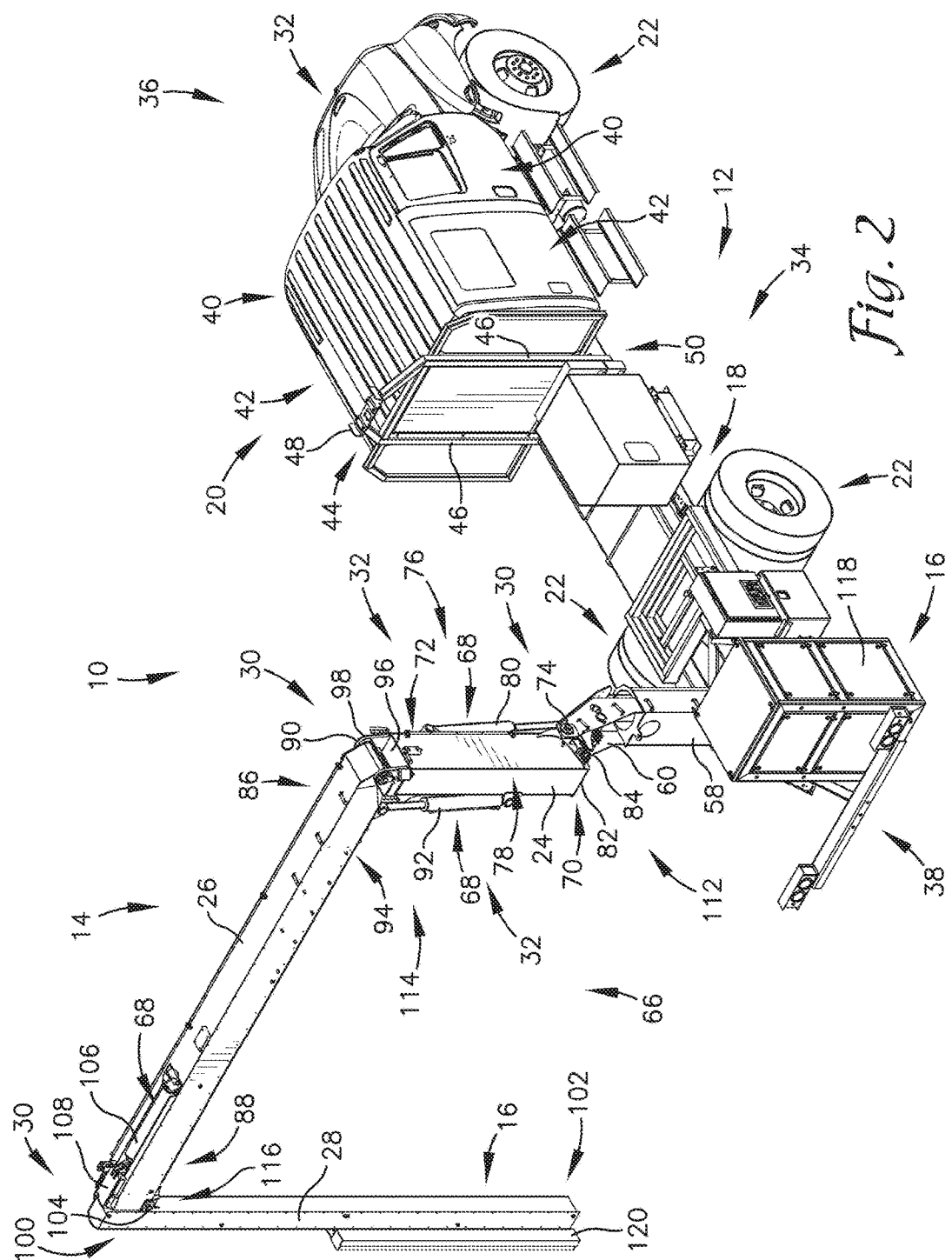
FIG. 2 is a perspective view of the first embodiment of the mobile scanner, illustrated in a deployed position.

The articulating boom assembly 14 is configured to be disposed in either of a traveling position, as illustrated in FIG. 1, and a deployed position, as illustrated in FIG. 2. While in the deployed position, the articulating boom assembly 14 presents a general inverted U-shape. A set of joints 30 disposed between the boom sections 24,26,28 keep the articulating boom assembly 14 in the deployed position while the scanning assembly 16 scans various object that pass through the general inverted U-shape of the deployed articulating boom assembly 14 without any external power provided by a boom-power system 32. The joints 30 therefore allow the articulating boom assembly 14 to remain in the deployed position for prolonged periods of time without requiring the running of a boom-power motor or other power-consumptive energy source, so as to allow the scanning assembly 16 to scan the object in a low-power mode.

An exemplary use for the invention is in the field of cargo scanning and non-intrusive inspection. Embodiments of the invention may be controlled and utilized by various safety, inspection, and defense personnel. For example, some embodiments of the invention may be utilized by the U.S. Department of Homeland Security for the scanning of cargo entering at ports and harbors into the United States. As another example, some embodiments of the invention may be utilized by private contractors providing for vehicle inspections at major sporting events. As still another example, some embodiments of the invention may be utilized by military personnel controlling a forward operating base.

It should be appreciated that the above is only an exemplary field of use for the invention. Other fields of use could include security scanning of people and luggage entering a secure facility. The stable design will therefore, in embodiments of the invention, allow the mobile scanner 10 to be utilized indoors and in other confined spaces in which a traditional internal combustion engine would be prohibited from running, due to fumes. In embodiments of the invention, the traditional hydraulic motor only needs to operate during the deployment of the articulating boom assembly 14 and can thereafter be turned off until the articulating boom assembly 14 is to be returned to a carrying position (as illustrated in FIG. 1).

The components of the mobile scanner 10 will now be discussed in greater detail. In embodiments of the invention, the components of the mobile scanner 10 generally comprise a truck 34, such as illustrated in FIGS. 1 and 2. In other embodiments, not illustrated, the components of the mobile scanner 10 generally comprise a trailer that is configured to be pulled by a tractor trailer or other vehicle. In still other embodiments, also not illustrated, the mobile scanner 10 is a stand-along unit configured to be transported to a certain location and deployed there. This may include the boom-power system 32 being separate from the mobile scanner 10. As such, the transportation vehicle may deliver the mobile scanner 10 to the location, deploy the articulating boom assembly 14 with an intrinsic boom-power system 32, and then leave the location. The mobile scanner 10 may then scan various objects after the transportation vehicle has left, and be later retrieved upon completion of the desired scanning.

In embodiments of the invention, as best illustrated in FIGS. 1 and 2, the base 12 is a truck 34 and includes the chassis 18, the cabin 20, and the plurality of wheels 22. The base 12 allows the mobile scanner 10 to move from location to location. For example, this can include moving from a headquarters location to an operating location. As another example, the mobile scanner 10 may move while scanning. In this "mobile mode" the mobile scanner 10 moves relative to a non-moving object to be scanned. In this way, the mobile scanner 10 may detect the interior contents of cargo containers, parked vehicles, and other stationary objects. In a "stationary mode," the mobile scanner 10 is stationary and the object to be scanned moves through the articulating boom assembly 14 so as to be scanned therein. The object moves through the articulating boom assembly 14 at a substantially steady rate, so as to the mobile scanner 10 to generate an image of the interior components of the object. In embodiments of the invention, in both the stationary mode and the mobile mode, the boom-power system 32 is disengaged, as the joints 30 keep the articulating boom assembly 14 in the deployed position. In other embodiments, the boom-power system 32 may be engaged while the mobile scanner 10 is in mobile mode but be disengaged while the mobile scanner 10 is in a stationary mode. This is because while in mobile mode the boom-power system 32 may be utilized to move other components of the mobile scanner 10, and or be powered by an internal combustion engine associated with the base 12 (such as the engine that drives the truck 34).

The chassis 18 traverses the base 12 to provide a support structure for the various other components, such as the articulating boom assembly 14 and the cabin 20. The chassis 18 generally presents an anterior end 36 and a posterior end 38. Typically, the articulating boom assembly 14 is disposed toward the posterior end 38 or at an intermediate location along the chassis 18. The cabin 20 is typically disposed toward the anterior end 36 of the chassis 18, so as to allow a driver to see during mobile operations.

In embodiments of the invention, the cabin 20 includes a driver cabin 40 and an operator cabin 42. Typically, the driver cabin 40 is disposed adjacent to the operator cabin 42 toward the anterior end 36. The driver cabin 40 is utilized for moving the mobile scanner 10, both during the above-discussed mobile mode and during transportation to the location (such as when the articulating boom assembly 14 is disposed in the traveling position, as illustrated in FIG. 1). The operator cabin 42 is utilized for observing the scanned images and otherwise controlling the scanning operations. This may be both during the mobile mode and the stationary mode. It should be appreciated that in many instances, a single operator will utilize the mobile scanner 10. In these instances, the operator may sit in the driver cabin 40 during mobile operations and sit in the operator cabin 42 during static operations. In some embodiments, the cabin 20 includes a single driver-operator cabin 42 in which the operator sits during both mobile operations and static operations. The cabin 20 may also include a motor therein for driving the vehicle. The motor may also drive a hydraulic pump of the boom-power system 32.

As used herein, "operator" refers to a person operating the mobile scanner 10 or assisting therewith, a person driving or pulling the mobile scanner 10, a person performing manual inspections in addition to the scanning, a person performing maintenance on the mobile scanner 10, a supervisor overseeing the operation of the mobile scanner 10, or other person consistent with the context.

In embodiments of the invention, as best illustrated in FIGS. 1 and 2, the cabin 20 includes a boom support 44 thereon for receiving a portion of the articulating boom assembly 14 thereon. The boom support 44 may be located toward the posterior end 38 of the cabin 20 and include at least one support arm 46 and a rest 48. The support arm 46 is secured to the chassis 18 to provide structural support to the rest 48. The rest 48 is configured to present a complementary shape to the articulating boom assembly 14 so as to receive the articulating boom assembly 14 thereon. While in the traveling position, as illustrated in FIG. 1, the articulating boom assembly 14 may lie on the boom support 44 for structural stability, and such that the boom-power system 32 need not maintain the orientation of the articulating boom assembly 14 during travel. The articulating boom assembly 14 may also be secured to the boom support 44 by a strap, a fastener, or the like to prevent damage to the articulating boom assembly 14 during transportation.

In embodiments of the invention, as best illustrated in FIGS. 1 and 2, the chassis 18 comprises the plurality of wheels 22, a drive train 50, a bumper 52, and a turret support 54. The plurality of wheels 22 is disposed to rotate via the drive train 50 upon the application of a rotation from the motor. The chassis 18 may also include at least a portion of the scanning assembly 16, as discussed below. In other embodiments of the invention, as discussed above, the chassis 18 is a trailer configured to be pulled by another vehicle. In still other embodiments, the base 12 does not include a chassis, such that the base 12 is configured to be lifted and emplaced by another vehicle.

Figure 4:
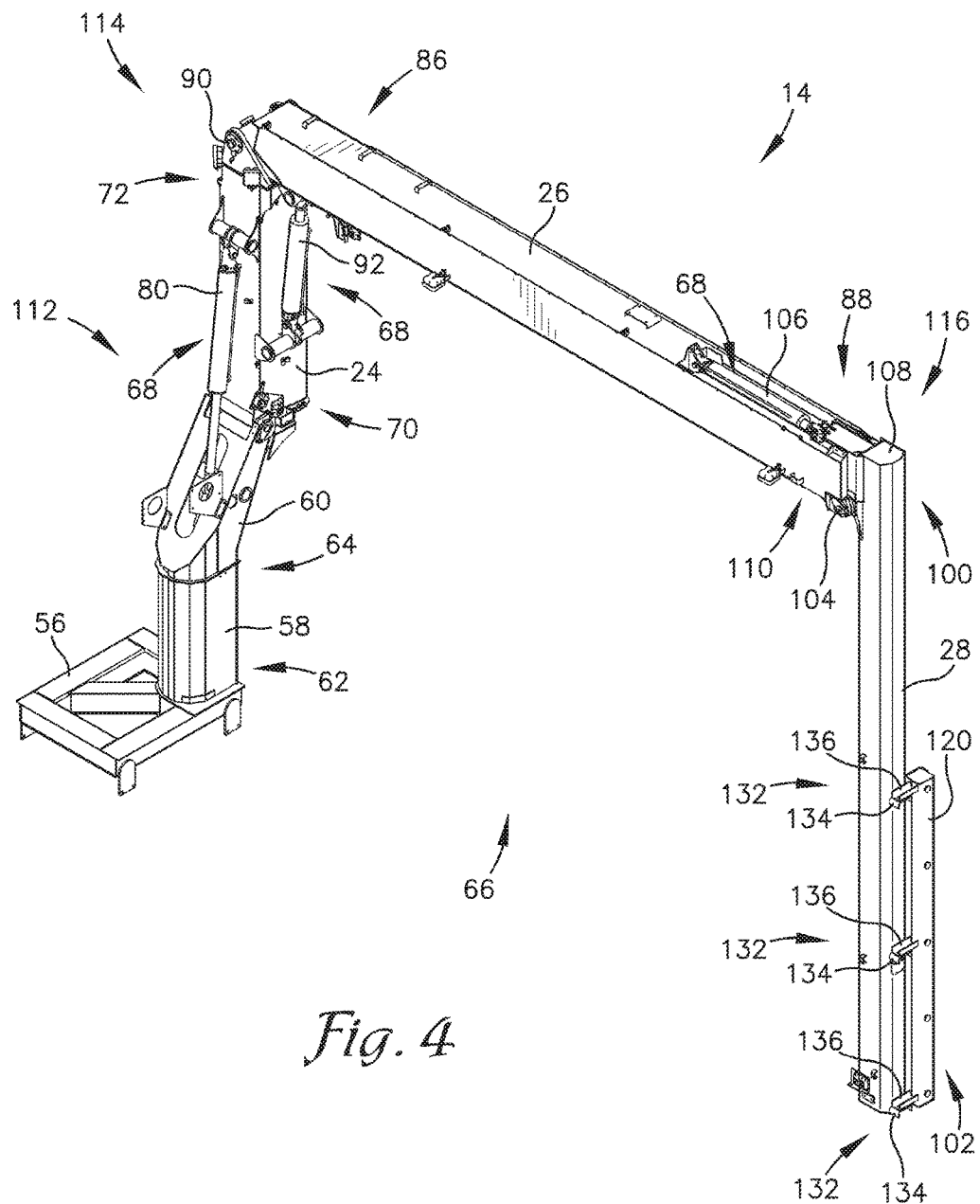
FIG. 4 is a perspective view of the articulating boom assembly of FIG. 3, illustrated in the deployed position.

In embodiments of the invention, as best illustrated in FIG. 4, the turret support 54 includes a support bracket 56, a post 58, and a boom turret 60. The post 58 is secured at a proximal end 62 to the support bracket 56 and/or the chassis 18 and secured at a distal end 64 to the boom turret 60. The articulating boom assembly 14 is secured to the boom turret 60. The boom turret 60 allows and/or actuates the and lifting of the articulating boom assembly 14. The post 58 is secured to the chassis 18 so as to raise the boom turret 60 to an appropriate height. This allows the boom turret 60 to rest the articulating boom assembly 14 down against the boom support 44 of the cabin 20 and be generally horizontal. In other embodiments, the boom turret 60 is secured directly to the chassis 18, without a post to raise the boom turret 60.

The boom turret 60 is disposed on the posterior end 38 of the chassis 18 and configured to raise the articulating boom assembly 14. In other embodiments, the boom turret 60 may be located centrally to the chassis 18 (e.g., between the anterior end 36 and the posterior end 38). In some embodiments of the invention, the boom turret 60 and the post 58 may be disposed away from a longitudinal axis of the chassis 18. As illustrated in FIGS. 1 and 2, in some embodiments of the invention, the boom turret 60 and the post 58 may be disposed toward a left (e.g., port) side of the vehicle. This positions the boom turret 60 (and by extension, the articulating boom assembly 14) proximate to the object to be scanned. In other embodiments of the invention, not illustrated, the boom turret 60 may be centrally located (so as to allow for deployment to either side of the vehicle) or disposed toward a right (e.g., starboard) side of the vehicle (so as to allow for deployment to the right side of the vehicle).

In some embodiments of the invention, the boom turret 60 allows only a straight vertical raising of the articulating boom assembly 14. In these embodiments, the boom turret 60 provides a base to pivot the articulating boom assembly 14 upward along a vertical plane. In other embodiments, the boom turret 60 rotates about a vertical axis so as to allow the articulating boom assembly 14 to rotate to a certain orientation relative to the chassis 18. In other embodiments of the invention, the boom turret 60 may also allow for a rotation about a vertical axis passing through the boom turret 60, so as to allow the articulating boom assembly 14 to be disposed at other orientations. This may include a rotation of the scanning assembly 16, so as to remain aligned.

Figure 3:
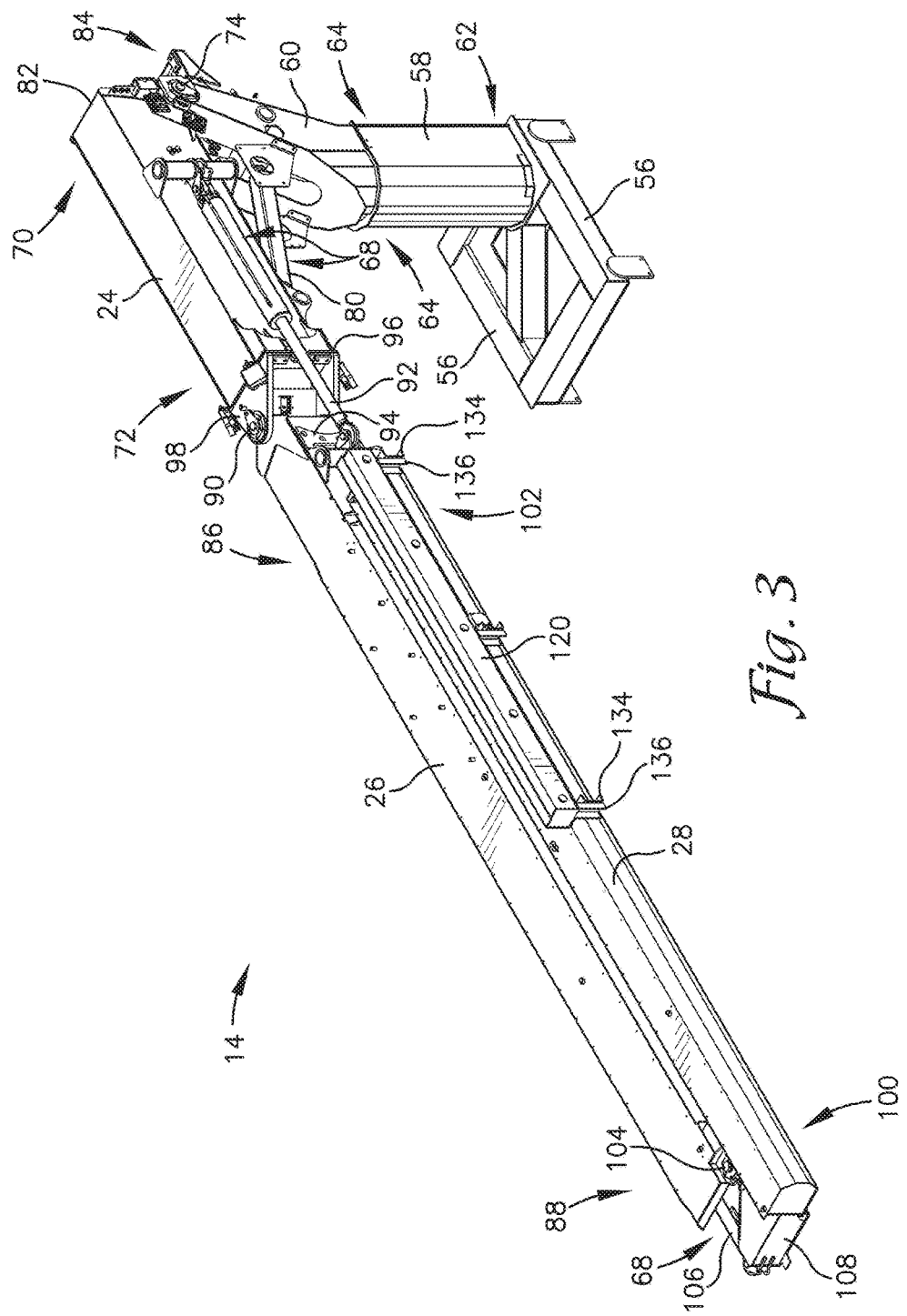
FIG. 3 is a perspective view of an articulating boom assembly of the mobile scanner, illustrated in the traveling position.

The articulating boom assembly 14 will now be discussed in greater detail. The articulating boom assembly 14 is mounted on the chassis 18 of the mobile scanner 10 to enable rotational and/or pivotal movement relative to the chassis 18 of the mobile scanner 10, as best illustrated in FIGS. 1 and 2. The articulating boom assembly 14 is configured to be disposed into a traveling position and a deployed position. In the traveling position, as illustrated in FIGS. 1 and 3, the articulating boom assembly 14 is folded and aligned such that it occupies minimal space. The traveling position allows for the mobile scanner 10 to move to and from the scanning location. In the deployed position, as illustrated in FIGS. 2 and 4, the articulating boom assembly 14 is unfolded into a scanning configuration. The scanning configuration presents a general inverted U-shape. The general inverted U-shape therefore presents an opening 66 or a channel therein, as best illustrated in FIGS. 2 and 4. The opening 66 is configured to receive the object to be scanned therein. In some instances, the object may pass through the opening 66 under its own power (such as a vehicle driving through the opening 66). In some instances, the mobile scanner 10 may move past the object such that the object passes through the opening 66.

In some embodiments of the invention, the deployed position is to the left (e.g., port) side relative to the base 12, as illustrated in FIG. 2. In other embodiments, not illustrated, the deployed position is to the right (e.g., starboard) side relative to the base 12. In some embodiments, the deployed position may be either to the left side or to the right side, as desired by the operator, so as to allow for deployment as needed by the situation. In some embodiments, the deployed position may be rearward (e.g., beyond the posterior end 38 of the base 12).

The articulating boom assembly 14 is moved between the deployed position and the traveling position by the boom-power system 32. The boom-power system 32 includes at least one actuator 68, such as a hydraulic cylinder, a pneumatic cylinder, a cylinder powered by an electric motor, or other type of actuator. Each actuator 68 moves each respective component of the articulating boom assembly 14 (as discussed below) between a respective traveling position and a respective deployed position. The respective positions may be elongated or shortened, depending on the layout of the actuators 68 relative to the respective components of the articulating boom assembly 14. Typically, an actuator 68 will be deployed between two components of the articulating boom assembly 14 (or between the articulating boom assembly 14 and the boom turret 60). The actuator 68 therefore changes the angle between the two respective components of the articulating boom assembly 14. Specific actuators 68 that move the articulating boom assembly 14 are discussed in more depth below. It should be appreciated that in embodiments of the invention, the boom-power system 32 operates by hydraulic power as generated by a hydraulic motor and delivered to the actuator 68, being a hydraulic cylinder, by a set of hydraulic lines (not illustrated). In other embodiments of the invention, the boom-power system 32 operates by pneumatic power as generated by a pneumatic motor and delivered to the actuator 68, being a pneumatic cylinder, by a set of pneumatic lines.

In embodiments of the invention, the articulating boom assembly 14 comprises the proximal vertical boom section 24, the intermediate horizontal boom section 26, and the distal vertical boom section 28. The proximal vertical boom section 24 is pivotably secured to the base 12, such as at the boom turret 60. The intermediate horizontal boom section 26 is disposed between the proximal vertical boom section 24 and the distal vertical boom section 28. It should be appreciated that the names of the respective boom sections, as used herein refer to their respective positions in the deployed position, and should be understood as exemplary for clarity to the reader. In the deployed position, as illustrated in FIG. 2, the proximal vertical boom section 24 and the distal vertical boom section 28 are each disposed substantially vertically (e.g., vertically perpendicular to a longitudinal axis of the chassis 18), and the intermediate horizontal boom section 26 is disposed horizontally (e.g., horizontally perpendicular to the longitudinal axis of the chassis 18). The proximal vertical boom section 24 is nearer to the chassis 18 than the distal vertical boom section 28, with the intermediate horizontal boom section 26 disposed therebetween and pivotably secured to each 24,28.

In embodiments of the invention, the proximal vertical boom section 24 is elongated so as to present a proximal end 70 and a distal end 72. The proximal end 70 of the proximal vertical boom section 24 is pivotably secured to the boom turret 60. The proximal end 70 is pivotably secured by a first pivot 74 traversing the boom turret 60 and the proximal end 70 of the proximal vertical boom section 24. The first pivot 74 is disposed toward an actuator side 76 of the proximal vertical boom section 24 and away from a passive side 78 that is opposite the actuator side 76.

A boom-raise actuator 80 is disposed on the actuator side 76 of the proximal vertical boom section 24. As the boom-raise actuator 80 elongates (moving from the traveling position to the deployed position), the proximal vertical boom section 24 pivots about the first pivot 74 until the proximal vertical boom section 24 is substantially vertical. In embodiments of the invention, at vertical a base edge 82 of the proximal vertical boom section 24 rests against a boom rest 84 of the boom turret 60. The boom rest 84 presents a complementary shape to the base end of the proximal vertical boom section 24. As such, once the boom-raise actuator 80 raises the proximal vertical boom section 24 to a vertical orientation, the proximal vertical boom section 24 will remain in the vertical orientation absent any other external force. The distal end 72 of the proximal vertical boom section 24 is pivotably secured to the intermediate horizontal boom section 26, as discussed below.

In embodiments of the invention, the intermediate horizontal boom section 26 is disposed between the proximal vertical boom section 24 and the proximal vertical boom section 24. The intermediate horizontal boom section 26 is elongated so as to present a proximal end 86 and a distal end 88. The proximal end 86 of the intermediate horizontal boom section 26 is pivotably secured to the distal end 72 of the proximal vertical boom section 24, at a second pivot 90.

A horizontal-deploy actuator 92 is secured to the proximal vertical boom section 24 and the intermediate horizontal boom section 26 to move the respective boom sections 24,26 between the traveling position and the deployed position. As illustrated in FIG. 1, in embodiments of the invention, the intermediate horizontal boom section 26 and the proximal vertical boom section 24 are substantially aligned while in the traveling position. Before, during, or after the actuation of the boom-raise actuator 80, the horizontal-deploy actuator 92 moves the intermediate horizontal boom section 26 to a position perpendicular to the proximal vertical boom section 24 (away from aligned, e.g., parallel along the same line).

While the proximal vertical boom section 24 is disposed vertically, as discussed above and illustrated in FIGS. 2 and 4, an actuator side 94 of the intermediate horizontal boom section 26 rests against a top edge 96 of the proximal vertical boom section 24. The top edge 96 of the proximal vertical boom section 24 presents a complementary shape to the actuator side 94 of the proximal end 86 of the intermediate horizontal boom section 26, such that the intermediate horizontal boom section 26 can rest against the top edge 96 at a substantially horizontal orientation. The second pivot 90 includes a pivot bracket 98 that extends from the top edge 96 of the proximal vertical boom section 24. The distal end 88 of the intermediate horizontal boom section 26 is pivotably secured to the distal vertical boom section 28, as discussed below.

The distal vertical boom section 28 is elongated so as to present a proximal end 100 and a distal end 102. The proximal end 100 of the distal vertical boom section 28 is pivotably secured to the distal end 88 of the intermediate horizontal boom section 26, at a third pivot 104. The distal end 102 of the distal vertical boom section 28 extends downward from the intermediate horizontal boom section 26. Various components of the scanning assembly 16, as discussed below, may also be secured to the distal vertical boom section 28.

A vertical deploy actuator 106 is secured to the distal vertical boom section 28 and the intermediate horizontal boom section 26 to move the respective boom sections 26,28 between the traveling position and the deployed position, as best illustrated in FIGS. 1, 2, and 4. As illustrated in FIG. 1, in embodiments of the invention, the intermediate horizontal boom section 26 and the distal vertical boom section 28 are substantially parallel while in the traveling position. Before, during, or after the actuation of the boom-raise actuator 80 and/or the horizontal-deploy actuator 92, the vertical deploy actuator 106 moves the distal vertical boom section 28 to a position perpendicular to the intermediate horizontal boom section 26 (such that the proximal vertical boom section 24 and the distal vertical boom section 28 are substantially parallel). In embodiments of the invention, the vertical deployment actuator is disposed at least partially within the distal end 88 of the intermediate horizontal boom section 26, and is generally aligned with the intermediate horizontal boom section 26.

While the distal vertical boom section 28 is disposed vertically in the deployed position, as discussed above and illustrated in FIGS. 4 and 6, a protrusion 108 of the intermediate horizontal boom section 26 rests against an interior edge 110 of the intermediate horizontal boom section 26. The protrusion 108 extends laterally from the proximal end 100 of the distal vertical boom section 28. The vertical deploy actuator 106 is pivotably secured to the protrusion 108 or other component of the proximal end 100 of the distal vertical boom section 28. The protrusion 108 of the distal vertical boom section 28 presents a complementary shape to a recess of the distal end 88 of the intermediate horizontal boom section 26, such that the protrusion 108 is configured to freely hang from the recess when in the deployed position. This allows the distal vertical boom section 28 to remain in the deployed position without additional actuation or power supplied by the vertical deploy actuator 106. The third pivot 104 includes a pivot bracket that extends from the distal end 88 of the intermediate horizontal boom section 26. The distal end 88 of the intermediate horizontal boom section 26 is pivotably secured to the distal vertical boom section 28, so as to allow the distal vertical boom section 28 to pivot relative to the intermediate horizontal boom section 26 by the vertical deploy actuator 106.

In embodiments of the invention, each of the proximal vertical boom section 24, the intermediate horizontal boom section 26, and the distal vertical boom section 28 present a generally square cross-section. In other embodiments, the cross-section shape may be a rectangle, a circle, a triangle, or other shape. In some embodiments, the cross-sectional shapes of the three respective boom sections 24,26,27 are each the same general shape. In other embodiments, the cross-sectional shapes may be different.

The proximal vertical boom section 24 presents a first cross-sectional area, the intermediate horizontal boom section 26 presents a second cross-sectional area, and the distal vertical boom section 28 presents a third cross-sectional area, as best illustrated in FIG. 1. In embodiments of the invention, the first cross-sectional area is larger than the second cross-sectional area and the third cross-sectional area, and the second cross-sectional area is greater than the third cross-sectional area. This may be because the proximal vertical boom section 24 supports the intermediate horizontal boom section 26 and the distal vertical boom section 28, the intermediate horizontal boom section 26 supports the distal vertical boom section 28, and the intermediate horizontal boom section 26 supports only various components of the scanning assembly 16 (as discussed below).

The articulating boom assembly 14 is configured to remain in the deployed position without input from the boom-power system 32. In some embodiments of the invention, the force of gravity keeps the respective boom sections in the deployed position. In some embodiments of the invention, an internal holding valve (not illustrated) in the actuator 68 traps the pressurized fluid in the actuator 68. The trapped pressurized fluid counteracts the effects of thermal changes in the pressurized fluid. Thermal changes (e.g., cooling) in the hydraulic lines could result in movement of the articulating boom assembly 14, absent the trapping of the pressurized fluid in the actuator 68. Thermal changes of the trapped fluid in the actuator 68 will decrease the pressure in the actuator 68, but the net pressure will keep the actuator 68 in its respective deployed position against its respective stop. For example, the vertical deploy actuator 106 keeps the protrusion 108 of the intermediate horizontal boom section 26 rests against the interior edge 110 of the intermediate horizontal boom section 26.

Figure 5:
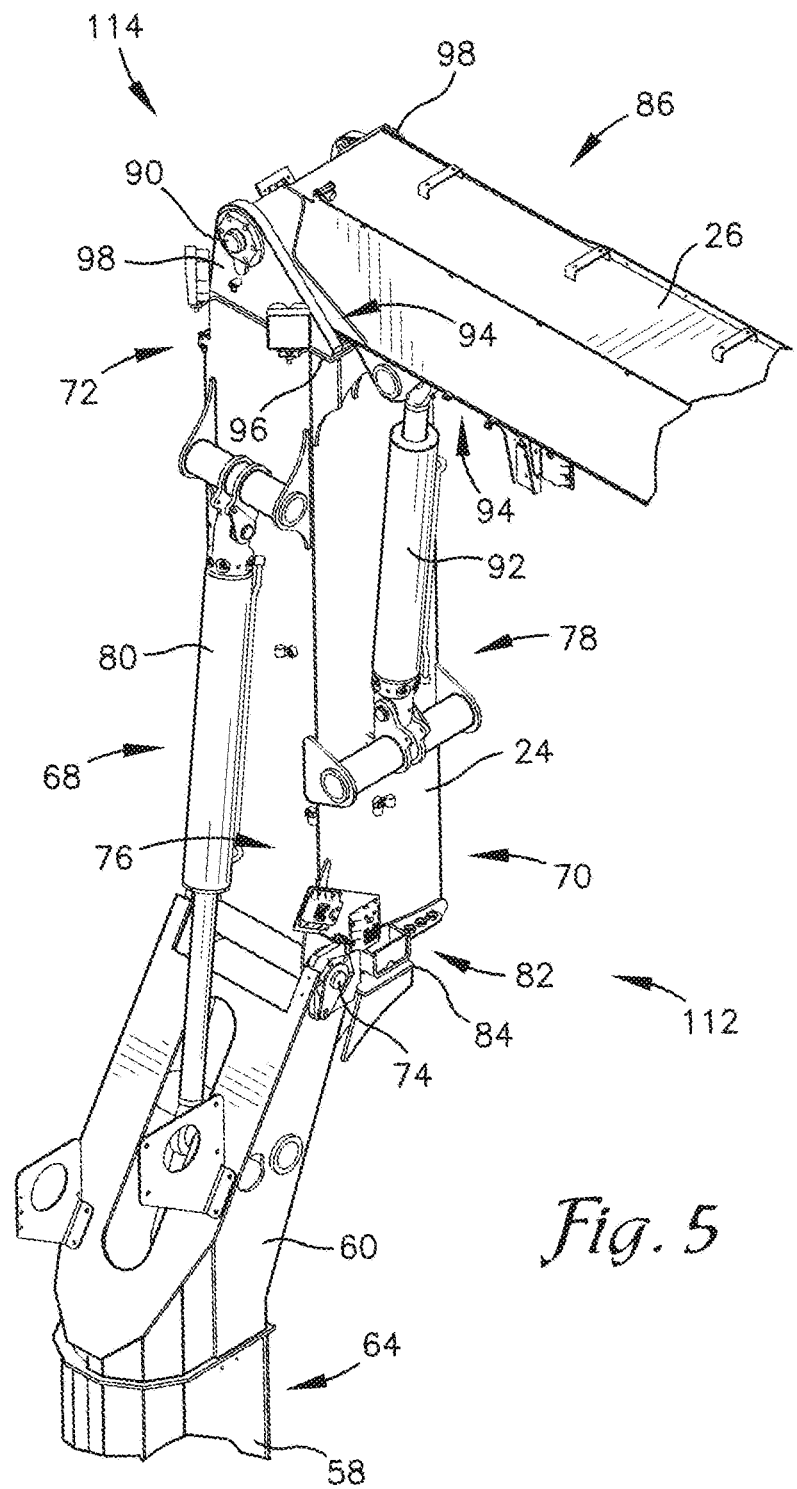
FIG. 5 is a perspective view of a proximal end of the articulating boom assembly in the deployed position.
Figure 6:
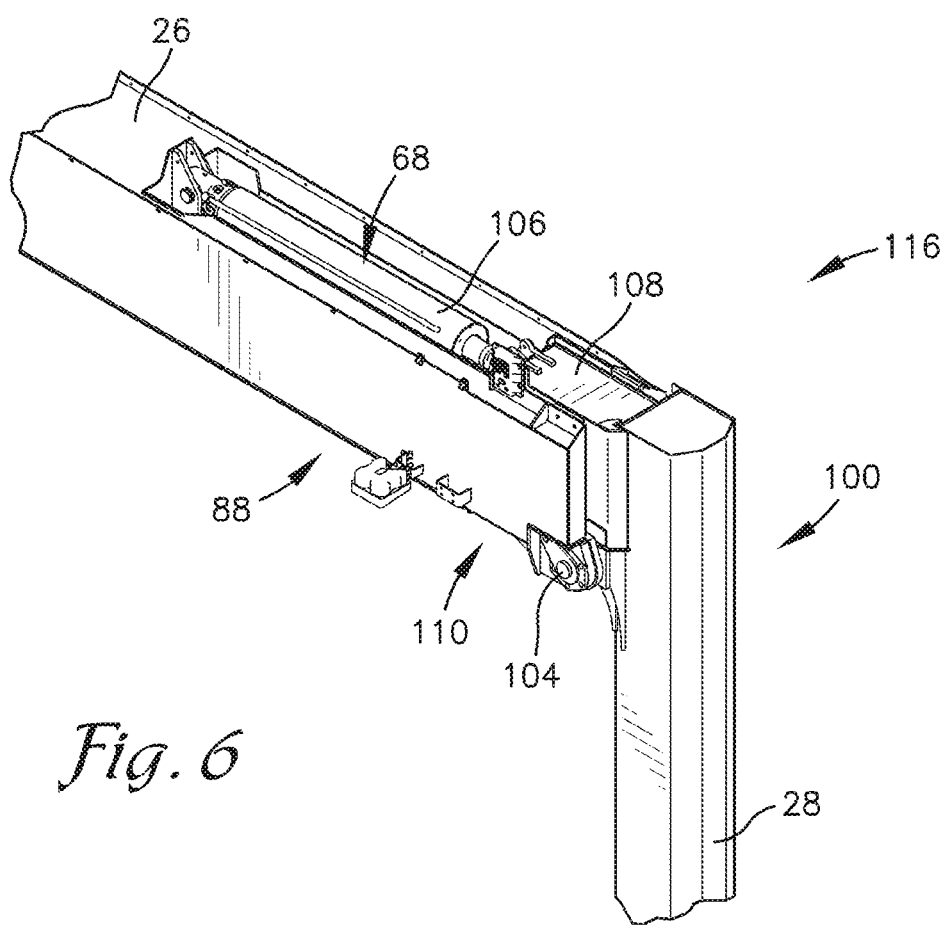
FIG. 6 is a perspective view of a distal end of the articulating boom assembly in the deployed position.

In embodiments of the invention, the articulating boom assembly 14 includes three joints 30 each configured to rest in the deployed position such that no further actuator power is necessary. A lower proximal joint 112 connects the proximal end 70 of the proximal vertical boom section 24 to the boom turret 60, as best illustrated in FIG. 5. An upper proximal joint 114 connects the distal end 72 of the proximal vertical boom section 24 to the proximal end 86 of the intermediate horizontal boom section 26, as best illustrated in FIG. 5. A distal joint 116 connects the distal end 88 of the intermediate horizontal boom section 26 to the proximal end 100 of the distal vertical boom section 28, as best illustrated in FIG. 6. The distal end 102 of the distal vertical boom section 28 is typically free hanging. The range of motion of the articulating boom assembly 14 prevents the distal vertical boom section 28 from contacting the ground, over substantially level or downward-sloping terrain. As such, the scanning assembly 16 can remain aligned without contact with the ground disturbing the alignment. In other embodiments, the distal end 102 of the distal vertical boom section 28 may rest against or otherwise contact the ground, such that the ground can support at least a portion of the weight of the articulating boom assembly 14.

The lower proximal joint 112 is operated by the boom-raise actuator 80, as illustrated in FIGS. 3, 4, and 5. The lower proximal joint 112 is comprised of the boom turret 60 and the proximal end 70 of the proximal vertical boom section 24. In the traveling position, the boom-raise actuator 80 is shortened such that the proximal vertical boom section 24 is generally horizontal and in contact with the boom support 44 of the cabin 20. In the operating position, the lower proximal joint 112 is at approximately 90 degrees (with the boom-raise actuator 80 is elongated such that the base edge 82 of the proximal vertical boom section 24 is in contact with the boom rest 84 of the boom turret 60). The load on the proximal vertical boom section 24 comes as a rotational moment (e.g. aligned with the pivoting axis of the pivot) from the extended intermediate horizontal boom section 26, such that the boom-raise actuator 80 need not perform work to keep the proximal vertical boom section 24 in a vertical position.

The upper proximal joint 114 is operated by the horizontal-deploy actuator 92, as illustrated in FIGS. 3, 4, and 5. The upper proximal joint 114 is comprised of the distal end 72 of the proximal vertical boom section 24 and the proximal end 86 of the intermediate horizontal boom section 26. In the traveling position, the upper proximal joint 114 is approximately 180 degrees (as the horizontal-deploy actuator 92 is elongated such that the intermediate horizontal boom section 26 is generally aligned with the proximal vertical boom section 24). In the operating position, the upper proximal joint 114 is approximately 90 degrees, such that the intermediate horizontal boom section 26 extends horizontally from the proximal vertical boom section 24. The load on the intermediate horizontal boom section 26 comes as a rotational moment downward from the distal end 88. The upper proximal joint 114 prevents movements downward beyond substantially 90 degrees, so as to counter the rotational movement. This keeps the intermediate horizontal boom section 26 in the deployed position without the horizontal-deploy actuator 92 performing work to keep the intermediate horizontal boom section 26 in the deployed position.

The distal joint 116 is operated by the vertical deploy actuator 106, as illustrated in FIGS. 3, 4, and 6. The distal joint 116 is comprised of the distal end 88 of the intermediate horizontal boom section 26 and the proximal end 100 of the distal vertical boom section 28. In the traveling position, the distal joint 116 is approximately 0 degrees (as the vertical deploy actuator 106 is elongated so as to rotate the protrusion 108 about the third pivot 104 until the distal vertical boom section 28 is substantially parallel with the intermediate horizontal boom section 26). In the operating position, the distal joint 116 is approximately 90 degrees (as the vertical deploy actuator 106 is shortened so as to rotate the protrusion 108 toward the vertical deploy actuator 106). The load on the distal vertical boom section 28 is a vertically downward sheering force. The protrusion 108 rests against the interior edge 110 of the intermediate horizontal boom section 26 so as to counter this downward sheering force.

The scanning assembly 16 will now be discussed in greater detail. The scanning assembly 16 is disposed at least in part on the articulating boom assembly 14 for scanning the object in the opening 66. The scanning assembly 16 moves relative to the object such that the entire object is scanned (either the mobile scanner 10 is moving, the object is moving, or both). At a given time, the scanning assembly 16 is scanning a single cross-section of the object. As such, as the scanning assembly 16 moves relative to the object, a complete cross-sectional image or other information is obtained. In embodiments of the invention, the scanning assembly 16 further comprises a computer for analyzing and displaying a representation of the detected scan signal to an operator. The complete cross-sectional image may then be analyzed, either by a human operator, by a computerized analyzer, or both. The analysis determines whether any of the above-discussed contraband is likely present in the object. If contraband is determined or suspected, the operator or other person may then perform a manual inspection or take other remedial actions, such as quarantining the object. In embodiments of the invention, the scanning assembly 16 may utilize gamma-ray scanning technology, such as utilizing cobalt-66 or other radioactive isotopes. In other embodiments of the invention, the scanning assembly 16 may utilize a high-energy X-ray technology.

In embodiments of the invention, the scanning assembly 16 comprises a scan source 118 and a scan detector 120. The scan source 118 is secured to the base 12, such as to the chassis 18 at the posterior end 38. In embodiments of the invention, the scan source 118 is secured to a posterior edge 122 of the chassis 18, and disposed between the chassis 18 and the bumper 52. The scan source 118 is configured to generate a scan signal, and is oriented so as to project the signal substantially into the opening 66. The scan source 118 emits the scan signal in a vertically oriented fan. In embodiments of the invention, the scan source 118 is substantially a rectangular prism.

The scan detector 120 is secured to the distal vertical boom section 28, as best illustrated in FIGS. 2 and 4. The scan detector 120 is elongated so as to detect the scan signals across a wide vertical range. The scan detector 120 is configured to detect at least a portion of the scan signal from the scan source 118. The scan signal therefore traverses the opening 66 from the scan source 118 to the scan detector 120. The object disposed within the opening 66 will therefore have at least a portion of the scan signal pass therethrough.

Figure 7:
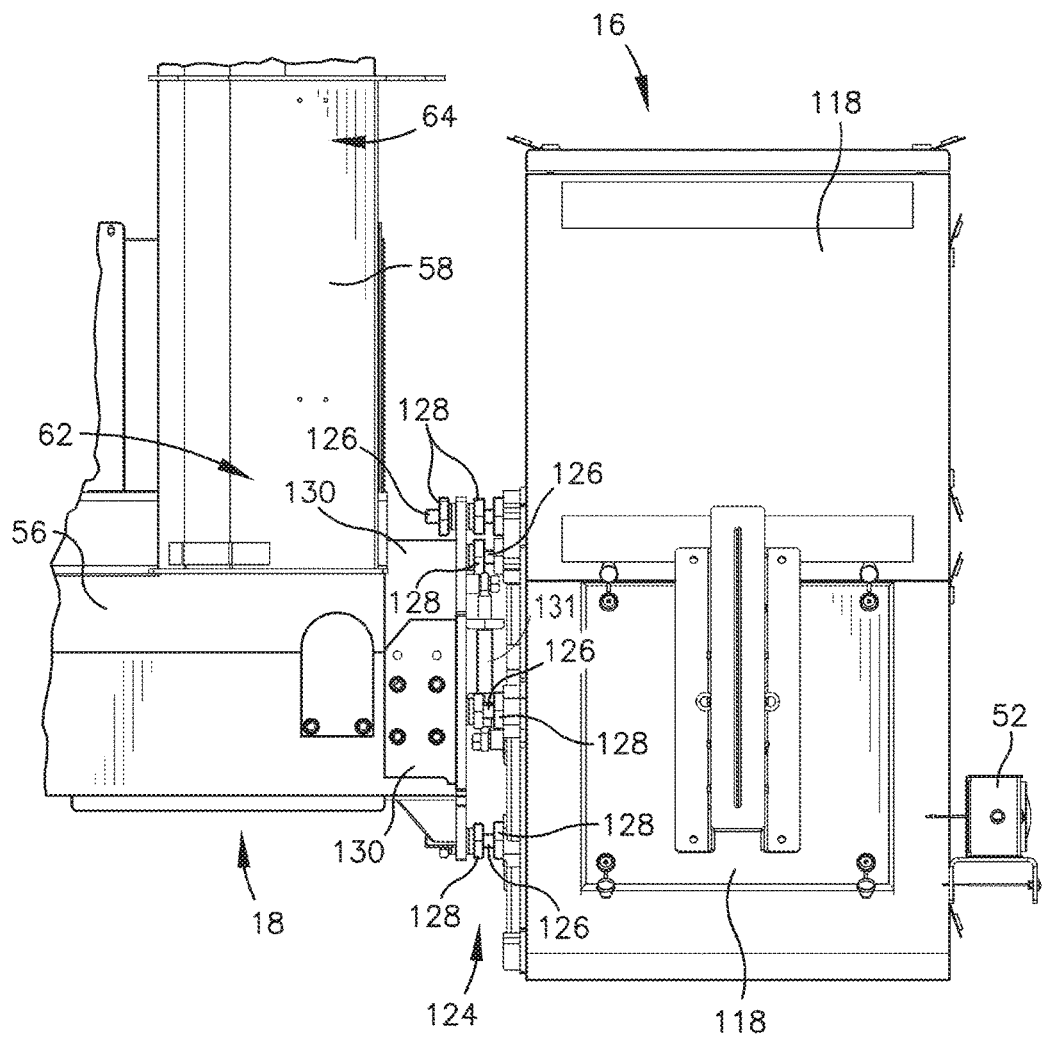
FIG. 7 is a side view of a scanning assembly illustrating a source securing bracket.

In embodiments of the invention, as illustrated in FIG. 7, a source securing bracket 124 is disposed on the base 12 and/or the chassis 18 for securing the scan source 118 to the base 12. The source securing bracket 124 is configured to place the scan source 118 into a range of positions relative to the base 12. Typically, this range of positions are disposed longitudinally (e.g., perpendicular to the direction of the scan signal and aligned with the chassis 18 of the base 12). The source securing bracket 124 allows an operator to align the scan source 118 with the scan detector 120 disposed on the distal vertical boom section 28. Because, as discussed above, embodiments of the invention do not allow the articulating boom assembly 14 to rotated about a vertical axis, alignment of the scan source 118 and the scan detector 120 can typically be performed periodically. Instead of utilizing the movement of the articulating boom assembly 14 to align the scan source 118 and the scan detector 120, as is common in the prior art, the source securing bracket 124 allows the operator to move the scan source 118 relative to the chassis 18. The source securing bracket 124 also allows the scan source 118 to remain in a fixed position relative to the chassis 18 (once in position as selected by the operator). Because the scan source 118 is in a fixed position relative to the chassis 18, alignment errors are reduced compared to scanning vehicles of the prior art in which the scan source is slid into a scanning position.

In embodiments of the invention, the source securing bracket 124 comprises a series of threaded protrusions 126 extending laterally from the scan source 118, a series of fasteners 128, and a chassis interface 130. The operator can secure the fasteners 128 to either side of the chassis interface 130 at a desired location. This allows the operator to change the longitudinal position of the scan source 118. In embodiments of the invention, the source securing bracket 124 further comprises a vertical support 131 for supporting at least a portion of the weight of the scan source 118. The vertical support allows for the operator to adjust the scan source 118 laterally (e.g., along the longitudinal direction of the chassis 18) without having to support the weight of the scan source 118. This makes the alignment of the scan source 118 with the scan detector 120 much easier for the operator to perform manually (e.g., without any assistance of powered supporting tools, hydraulic cylinders, jacks, or the like). The vertical support 131 also reduces the load on the threaded protrusions 126.

In embodiments of the invention, as best illustrated in FIGS. 3 and 4, a detector securing bracket 132 secures the scan detector 120 to the distal vertical boom section 28. The detector securing bracket 132 includes at least one boom protrusion 134 and at least one detector protrusion 136. The boom protrusions 134 are secured to the detector protrusions 136. As illustrated in FIG. 4, the detector securing bracket 132 may include three boom protrusions 134 and three detector protrusions 136. In some embodiments of the invention, the detector securing bracket 132 is also configured to be expanded and retracted in the base 12 longitudinal direction.

In some embodiments, not illustrated, the mobile scanner 10 further comprises a vertical scanning assembly. While the above-discussed scanning assembly 16 typically scans in a generally horizontal orientation, the vertical scanning assembly is configured to scan in a generally vertical orientation. The vertical scanning assembly may include a vertical scan source 118 disposed on the intermediate horizontal boom section 26 and a vertical scan detector 120 disposed on the ground. The object may then pass overt the vertical scan detector 120 such that the object is between the vertical scan source 118 and the vertical scan detector 120 (as well as being between the scan source 118 and the scan detector 120). The vertical scan detector 120 may be a stand-alone component that the operator places on the ground, a permanently installed component of the location in which the scanning is being performed, or may be deployed from the mobile scanner 10 similarly to an outrigger.

While methods of using, deploying, and operating the above-discussed components have been discussed throughout, a method of utilizing embodiments of the invention will now be discussed for clarity. In embodiments of the invention, a method of placing an articulating boom assembly 14 of a mobile scanner 10 into a deployed position comprises: elongating a boom-raise actuator 80 disposed between a boom turret 60 and a proximal vertical boom section 24; ceasing to elongate the boom-raise actuator 80 upon a base edge 82 of the proximal vertical boom section 24 contacting a boom rest 84 of the boom turret 60 such that the proximal vertical boom section 24 is disposed vertically upward; shortening a horizontal-deploy actuator 92 disposed between the proximal vertical boom section 24 and an intermediate horizontal boom section 26; ceasing to shorten the horizontal-deploy actuator 92 upon an actuator side 94 of the intermediate horizontal boom section 26 resting on a top edge 96 of the proximal vertical boom section 24 such that the intermediate horizontal boom section 26 is disposed horizontally; elongating a vertical deploy actuator 106 disposed between the intermediate horizontal boom section 26 and a distal vertical boom section 28; and ceasing to elongate the vertical deploy actuator 106 upon a protrusion 108 of the distal vertical boom section 28 resting on an interior edge 110 of the intermediate horizontal boom section 26 such that the distal vertical boom section 28 is disposed vertically downward.

In some embodiments of the invention, the above discussed elongated and shortening steps may be performed substantially simultaneously such that the articulating boom assembly 14 is moved to the deployed position substantially simultaneously. In other embodiments, the deployment may be sequential. Similarly, in embodiments of the invention, the three discussed ceasing steps may be performed simultaneously or sequentially. It should be appreciated that the ceasing steps may be performed be ceasing to pump hydraulic fluid to the respective actuator 68. In embodiments of the invention, the ceasing steps may be performed by capturing the pressurized fluid in the actuator 68 so as to prevent further actuation of the actuator 68 due to thermal changes to the pressurized fluid. The capturing of the pressurized fluid may include operating an internal holding valve that is within, adjacent to, or otherwise associated with the actuator 68.

Some embodiments of the method may also include: moving a scan source 118 of a scanning assembly 16 from a first position to an aligned position, wherein the aligned position includes the scan source 118 being aligned with a scan receptor disposed on the distal vertical boom section 28; passing an object through an opening 66 presented by the proximal vertical boom section 24, the intermediate horizontal boom section 26, and the distal vertical boom section 28; and scanning the object as it passes through the opening 66 by emitting a scan signal from the scan source 118 to the scan receptor.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A mobile scanner comprising:
   a base; and
   an articulating boom assembly, including—
      a proximal vertical boom section pivotably secured to the base;
      a distal vertical boom section;
      an intermediate horizontal boom section disposed between the proximal vertical boom section and the proximal vertical boom section,
      wherein the proximal vertical boom section, the distal vertical boom section, and the intermediate horizontal boom section form a general inverted U-shape when in a deployed position,
      wherein the general inverted U-shape presents an opening therethrough for the passing of an object to be scanned;
   a scanning assembly disposed at least in part on the distal vertical boom section for scanning the object in the opening; and
   a boom-power system configured to place the articulating boom assembly into the deployed position,
   wherein the proximal vertical boom section is configured with a protrusion,
   wherein a top edge of the protrusion is configured to support the intermediate horizontal boom section such that the articulating boom assembly remains in the deployed position without the boom-power system keeping the articulating boom assembly in the deployed position,
   wherein an actuator side of the intermediate horizontal boom section rests against the top edge of the protrusion.

2. The mobile scanner of claim 1, wherein the base comprises:
   a chassis;
   a boom turret disposed on a posterior end of the chassis and pivotably secured to the articulating boom assembly; and
   a cabin disposed on an anterior end of the chassis including a boom rest thereon.

3. The mobile scanner of claim 2, further comprising:
   a lower proximal joint pivotably securing the proximal vertical boom section to the boom turret about a first pivot,
   wherein a base edge of the proximal vertical boom section is configured to rest against a boom rest of the boom turret while the articulating boom assembly is in the deployed position.

4. The mobile scanner of claim 3,
   wherein the boom-power system includes a boom-raise actuator disposed between the proximal vertical boom section and the boom turret, wherein the boom raise actuator is configured to apply a force to move the proximal vertical boom section to the deployed position and cease applying the force while the proximal vertical boom section is in the deployed position.

5. The mobile scanner of claim 1, wherein the articulating boom assembly further comprises:
   an upper proximal joint disposed between the proximal vertical boom section and the intermediate horizontal boom section,
   wherein an actuator side of the intermediate horizontal boom section is configured to rest against a top edge of the proximal vertical boom section while the articulating boom assembly is in the deployed position.

6. The mobile scanner of claim 5,
   wherein the boom-power system includes a horizontal-deploy actuator disposed between the proximal vertical boom section and the intermediate horizontal boom section,
   wherein the horizontal deploy actuator is configured to apply a force to move the intermediate horizontal boom section to the deployed position and cease applying the force while the intermediate horizontal boom section is in the deployed position.

7. The mobile scanner of claim 1, wherein the articulating boom assembly further comprises:
   a distal joint disposed between the intermediate horizontal boom section and the distal vertical boom section,
   wherein a protrusion of the distal vertical boom section is configured to rest against an interior edge of the intermediate horizontal boom section while the articulating boom assembly is in the deployed position.

8. The mobile scanner of claim 7,
   wherein the boom-power system includes a vertical deploy actuator disposed at least partially within the intermediate horizontal boom section,
   wherein the vertical deploy actuator is pivotably secured to the protrusion of the distal vertical boom section,
   wherein the vertical deploy actuator is configured to apply a force to move the distal vertical boom section to the deployed position and capture a pressurized fluid so as to keep the distal vertical boom section in the deployed position.

9. The mobile scanner of claim 1, wherein the scanning assembly comprises:
   a scan source secured to the base;
   a scan detector secured to the distal vertical boom section,
   wherein the scan source is configured to generate a scan signal,
   wherein the scan detector is configured to detect at least a portion of the scan signal from the scan source; and
   a computer for analyzing and displaying a representation of the detected scan signal to an operator.

10. The mobile scanner of claim 9, wherein the scanning assembly further comprises:
    a securing bracket securing the scan source to the base,
    wherein the securing bracket is configured to place the scan source into a range of positions relative to the base,
    wherein securing bracket allows an operator to align the scan source with the scan detector disposed on the distal vertical boom section.

11. An articulating boom assembly configured to be utilized with a mobile scanner, the articulating boom assembly comprising:
    a boom turret;
    a proximal vertical boom section pivotably secured to the boom turret;
    a distal vertical boom section; and
    an intermediate horizontal boom section disposed between the proximal vertical boom section and the proximal vertical boom section,
    wherein the proximal vertical boom section, the distal vertical boom section, and the intermediate horizontal boom section form a general inverted U-shape when in a deployed position,
    wherein the general inverted U-shape presents an opening therethrough,
    wherein the proximal vertical boom section is configured with a protrusion,
    wherein a top edge of the protrusion is configured to support the intermediate horizontal boom section and the distal vertical boom section such that the articulating boom assembly remains in the deployed position absent a boom-power system,
    wherein an actuator side of the intermediate horizontal boom section rests against the top edge of the protrusion.

12. The articulating boom assembly of claim 11, wherein the boom turret is configured to be secured to a chassis of a mobile scanner so as to allow for transportation of the articulating boom assembly.

13. The articulating boom assembly of claim 11, further comprising:
    a lower proximal joint configured to pivotably secure the proximal vertical boom section to the boom turret about a first pivot,
    wherein a base edge of the proximal vertical boom section is configured to rest against a boom rest of the boom turret while the articulating boom assembly is in the deployed position.

14. The articulating boom assembly of claim 13, further comprising:
    a boom raise actuator disposed between the proximal vertical boom section and the boom turret,
    wherein the boom raise actuator is configured to apply a force to move the proximal vertical boom section to the deployed position and cease applying the force while the proximal vertical boom section is in the deployed position.

15. The articulating boom assembly of claim 11, further comprising:
    an upper proximal joint disposed between the proximal vertical boom section and the intermediate horizontal boom section,
    wherein an actuator side of the intermediate horizontal boom section is configured to rest against a top edge of the proximal vertical boom section while the articulating boom assembly is in the deployed position.

16. The articulating boom assembly of claim 15, further comprising
    a horizontal deploy actuator disposed between the proximal vertical boom section and the intermediate horizontal boom section,
    wherein the horizontal deploy actuator is configured to apply a force to move the intermediate horizontal boom section to the deployed position and cease applying the force while the intermediate horizontal boom section is in the deployed position.

17. The articulating boom assembly of claim 11, further comprising:
    a distal joint disposed between the intermediate horizontal boom section and the distal vertical boom section, wherein a protrusion of the distal vertical boom section is configured to rest against an interior edge of the intermediate horizontal boom section while the articulating boom assembly is in the deployed position.

18. The articulating boom assembly of claim 17, further comprising:
a vertical deploy actuator disposed at least partially within the intermediate horizontal boom section,
wherein the vertical deploy actuator is pivotably secured to the protrusion of the distal vertical boom section,
wherein the vertical deploy actuator is configured to apply a force to move the distal vertical boom section to the deployed position and capture a pressurized fluid so as to keep the distal vertical boom section in the deployed position.

19. A method of placing an articulating boom assembly of a mobile scanner into a deployed position, the method comprising the following steps:
elongating a boom raise actuator disposed between a boom turret and a proximal vertical boom section;
ceasing to elongate the boom raise actuator upon a base edge of the proximal vertical boom section contacting a boom rest of the boom turret such that the proximal vertical boom section is disposed vertically upward;
shortening a horizontal deploy actuator disposed between the proximal vertical boom section and an intermediate horizontal boom section;
ceasing to shorten the horizontal deploy actuator upon an actuator side of the intermediate horizontal boom section resting on a top edge of the proximal vertical boom section such that the intermediate horizontal boom section is disposed horizontally;
elongating a vertical deploy actuator disposed between the intermediate horizontal boom section and a distal vertical boom section; and
ceasing to elongate the vertical deploy actuator upon a top edge of a protrusion of the distal vertical boom section resting on an interior edge of the intermediate horizontal boom section such that the distal vertical boom section is disposed vertically downward,
wherein the proximal vertical boom section is configured to support the intermediate horizontal boom section such that the articulating boom assembly remains in the deployed position absent a boom-power system.

20. The method of claim 19, further comprising the following steps:
moving a scan source of a scanning assembly from a first position to an aligned position;
wherein the aligned position includes the scan source being aligned with a scan receptor disposed on the distal vertical boom section;
passing an object through an opening presented by the proximal vertical boom section, the intermediate horizontal boom section, and the distal vertical boom section;
scanning the object as it passes through the opening by emitting a scan signal from the scan source to the scan receptor.

* * * * *